(12) United States Patent
Chen et al.

(10) Patent No.: US 7,310,235 B2
(45) Date of Patent: Dec. 18, 2007

(54) COMPUTER ENCLOSURE

(75) Inventors: Yun-Lung Chen, Tu-Cheng (TW); Quan-Guang Du, Shenzhen (CN); Shi-Zhong Zhou, Shenzhen (CN); Dong Qin, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 69 days.

(21) Appl. No.: 11/150,994

(22) Filed: Jun. 13, 2005

(65) Prior Publication Data

US 2006/0133053 A1 Jun. 22, 2006

(30) Foreign Application Priority Data

Dec. 18, 2004 (CN) .................. 2004 2 0103136 U

(51) Int. Cl.
*H05K 5/00* (2006.01)
(52) U.S. Cl. ...................... 361/752; 361/790; 361/807; 361/810
(58) Field of Classification Search ................ 361/752, 361/790, 797, 800, 810, 807; 174/138
See application file for complete search history.

(56) References Cited

U.S. PATENT DOCUMENTS

| 5,661,640 | A | * | 8/1997 | Mills et al. | .................. 361/801 |
| 6,097,591 | A | | 8/2000 | Ircha | |
| 6,147,862 | A | * | 11/2000 | Ho | .............................. 361/685 |
| 6,385,036 | B1 | | 5/2002 | Chien | |
| 2004/0085725 | A1 | * | 5/2004 | Liu | .............................. 361/685 |

* cited by examiner

*Primary Examiner*—Tuan T. Dinh
*Assistant Examiner*—Hung S Bui
(74) *Attorney, Agent, or Firm*—Morris Manning Martin LLP; Tim Tingkang Xia, Esq.

(57) ABSTRACT

A computer enclosure includes a base (10), a first retaining member (20) and a bracket (40). The base has a side panel (12) and a top panel (11) extending from one edge of the side panel. The first retaining member and a second retaining member are separately fixed on the side panel for securing a circuit board. The bracket is attached to the first retaining member. The top panel of the base and the first retaining member are shared with the bracket to form a cage for receiving a storage device.

13 Claims, 3 Drawing Sheets

US 7,310,235 B2

COMPUTER ENCLOSURE

BACKGROUND OF THE INVENTION

1. Field of the Invention

The present invention relates to computer enclosures, and more particularly to a computer enclosure having a compact structure.

2. Background of the Invention

In a computer system, electronic elements, such as storage devices, power supply and motherboard are needed to perform various functions. Supporting structures are accordingly provided to hold the electronic elements.

A computer enclosure usually includes a base, a cover for covering the base, a drive bracket for accommodating a storage device, a power supply bracket for accommodating a power supply and a supporting plate for securing a motherboard. The brackets are generally a rectangular frame each having entries for the storage device or the power supply inserted therethrough. The brackets are mounted to a top portion of the base. The supporting plate is fixed to a side panel of the base. The arrangement is fairly cumbersome. In manufacturing the structure of the computer enclosure described above, the cost is high and the complexity of working procedure is increased.

What is needed, therefore, is a computer enclosure which has a compact structure for reducing the manufacturing material and cost thereby.

SUMMARY

A computer enclosure includes a base, a first retaining member and a bracket. The base has a side panel and a top panel extending from one edge of the side panel. The first retaining member and a second retaining member are separately fixed on the side panel for securing a circuit board. The bracket is attached to the first retaining member. The top panel of the base and the first retaining member are shared with the bracket to form a cage for receiving a storage device.

Advantages and novel features of the present invention will be drawn from the following detailed description of preferred embodiment with attached drawings, in which:

DETAIL DESCRIPTION OF PREFERRED EMBODIMENT

Figure 1:
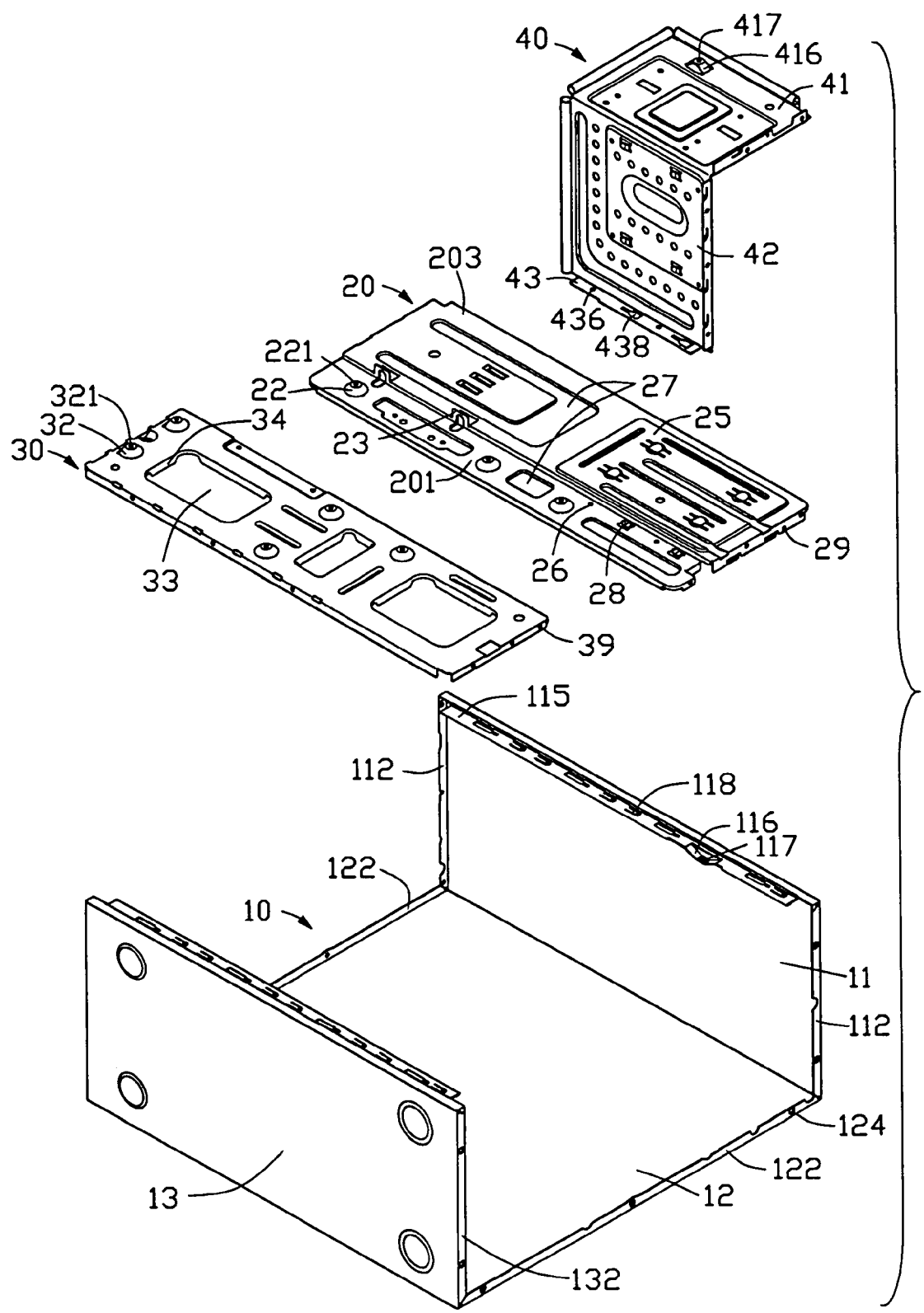
FIG. 1 is an exploded, isometric view of a computer enclosure of a preferred embodiment of the present invention, the computer enclosure including a base, first and second retaining members and a bracket.

Referring to FIG. 1, a computer enclosure includes a base 10, first and second retaining members 20, 30 adapted for supporting a circuit board such as a motherboard 50, and a bracket 40.

The base 10 includes a side panel 12, a bottom panel 13 and a top panel 11 extending perpendicularly from opposite edges of side panel 12. A plurality of flanges 112, 122, 115 and 132 is formed on edges of top panel 11, side panel 12 and bottom panel 13 respectively. A plurality of mounting holes 124 is defined in the flanges 112, 122 and 132. A concave portion 116 is formed on the flange 115 of the top panel 1, and a screw hole 117 is defined therein.

The first and second retaining members 20, 30 are substantially rectangular plates. The first retaining member 20 includes a circuit board area 201, a drive area 25 and a power supply area 203. A plurality of protrusions 22, 32 projects from the circuit board area 201 of the first and second retaining members 20, 30 respectively. Securing holes 221, 321 are defined in the protrusions 22, 32 respectively. Two locking holes 26 are defined in the circuit board area 201 adjacent to the drive area 25. Two positioning tabs 28 protrude upwardly therefrom adjacent to the locking holes 26. Two locating tabs 23 are formed on the first retaining member adjacent to the power supply area 203. A plurality of grooves 27 and slots 33 are defined in the first and second retaining members 20, 30. A plurality of ribs 34 extends downwardly from edges of the slots 33. A plurality of mounting holes 29, 39 is defined in side surfaces of the first and second retaining members 20, 30 corresponding to the mounting holes 124 of the flange 122 of the base 10.

The bracket 40 includes a side plate 41 and a bottom plate 42 extending perpendicularly from an edge of the side plate 41. A convex portion 416 is formed on the side plate 41 corresponding to the concave portion 116 of the base 10. A screw hole 417 is defined in the convex portion 416 thereof. A supporting rim 43 extends perpendicularly outward from a lower edge of the bottom plate 42. Two locking holes 436 are defined in the supporting rim 43 corresponding to the locking holes 26 of the first retaining member 20. Two positioning holes 438 are defined therein for receiving the positioning tabs 28 of the first retaining member 20.

Figure 2:
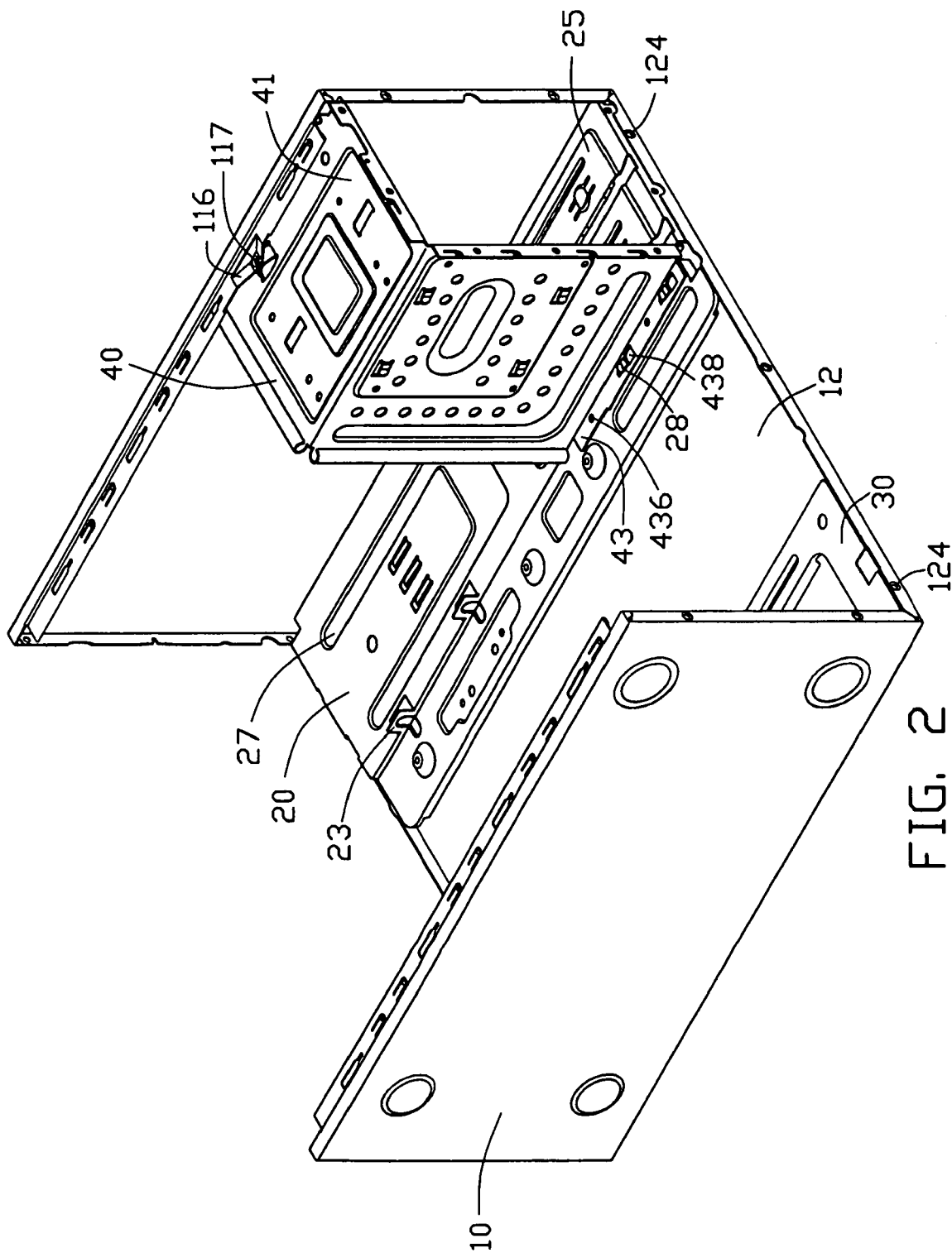
FIG. 2 is an assembly view of FIG. 1.

Referring also to FIG. 2, in assembly, the first and second retaining members 20, 30 are placed on the side panel 12 of the base adjacent to the top panel 11 and the bottom panel 13 respectively. An empty area is remained between the first retaining member 20 and the second retaining member 30. A plurality of fasteners, such as screws, are screwed into the mounting holes 29, 39 and 124 of the base 10 and the first and second retaining members 20, 30, thereby securing the first and second retaining members 20, 30 into the base 10. The bracket 40 is placed on the first retaining member 20 corresponding to the drive area 25. The positioning tabs 28 insert into the positioning holes 438 of the supporting rim 43 of the bracket 40. The locking holes 436 align with the locking holes 26 of the first retaining member 20 with screws (unshown) extending therethrough. The convex portion 416 of the side plate 41 of the bracket 40 abuts against the concave portion 116 of the flange 115 of the base. A plurality of fasteners is screwed into the screw hole 417 of the convex portion 416 and the screw hole 117 of the concave portion 116. The bracket 40 is thus fixed to the base 10. Thus, the first retaining member 20 and the top panel 11 are shared with the bracket 40 to form a cage for receiving a storage device.

Figure 3:
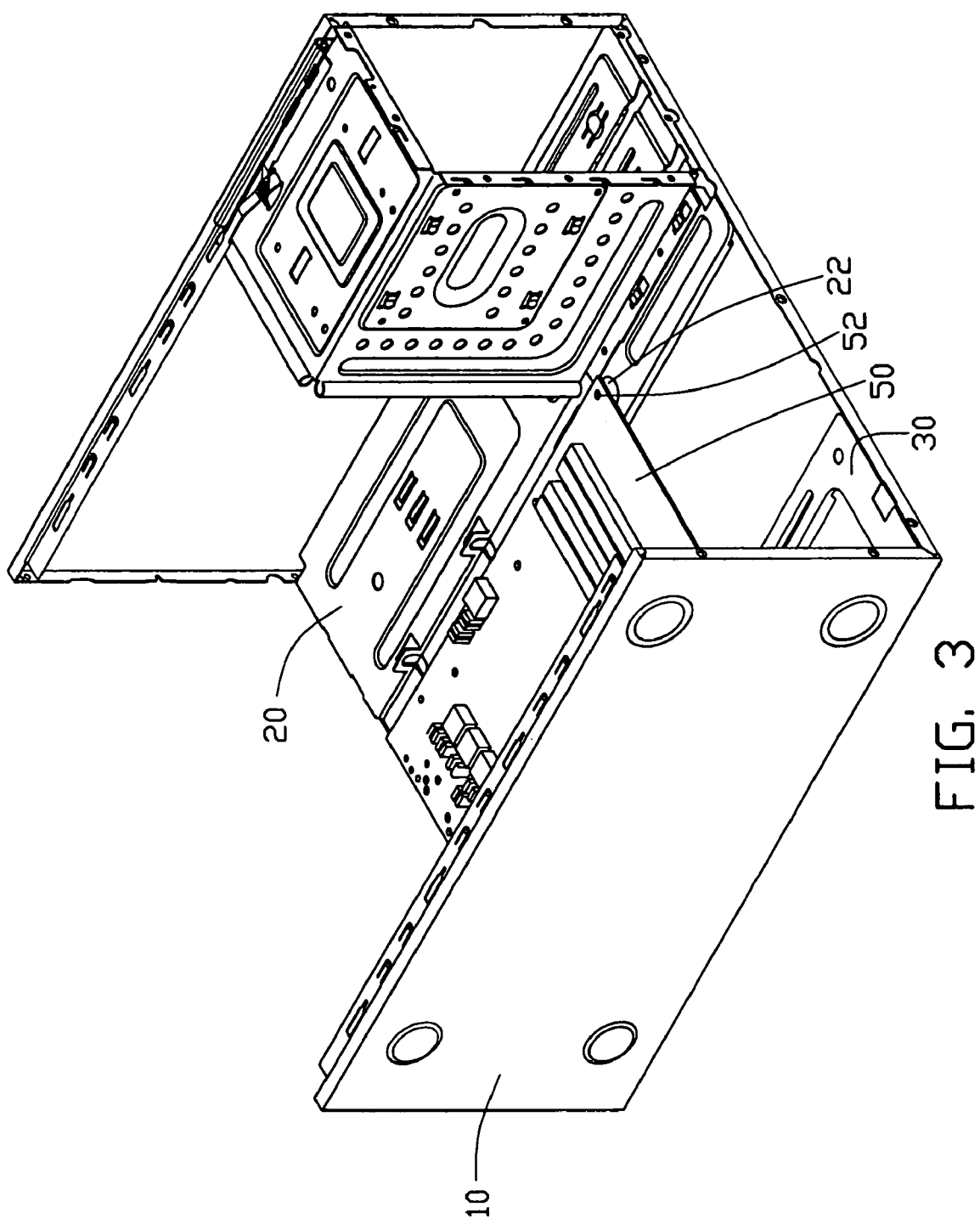
FIG. 3 is similar to FIG. 2, and showing a circuit board secured to the first and second retaining members.

Referring also to FIG. 3, in use, the motherboard 50 can be simply screwed to the protrusions 22, 32 of the circuit board area 201 of the first retaining member 20 and the second retaining member 30. The motherboard 50 is secured above the empty area between the first retaining member 20 and the second retaining member 30.

A power supply (unshown) is fixed on the power supply area 203 of the first retaining member 20 with screws (unshown) attaching to the locating tabs 23.

It is to be understood, however, that even though numerous characteristics and advantages have been set forth in the foregoing description of preferred embodiments, together with details of the structure and function, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A computer enclosure comprising:
   a base having a side panel and a top panel extending from one edge of the side panel;
   a first retaining member and a second retaining member separately fixed on the side panel for cooperatively securing a circuit board, the first retaining member and the second retaining member respectively parallel to the side panel; and
   a bracket attached to the first retaining member, wherein the top panel of the base and the first retaining member are shared with the bracket to form a cage for receiving a storage device;
   wherein a flange extends from the side panel of the base for engaging with the first retaining member;
   wherein a plurality of mounting holes is defined in the flange, and a plurality of mounting holes is defined in a side surface of the first retaining member corresponding to the mounting holes of the flange.

2. The computer enclosure as described in claim 1, wherein a concave portion protrudes from the top panel of the base, and a convex portion is formed on the bracket for engaging with the concave portion of the top panel.

3. The computer enclosure as described in claim 1, wherein a supporting rim bends from the bracket for engaging with the first retaining member.

4. The computer enclosure as described in claim 3, wherein a positioning hole is defined in the supporting rim, and a positioning tab protrudes from the first retaining member for engaging in the positioning hole.

5. A computer system comprising:
   a base having a side panel;
   a first retaining member and a second retaining member secured to the side panel with an empty area remained therebetween;
   a circuit board being mounted on the first and second retaining members above the empty area, and parallel to the first and second retaining members; and
   a bracket cooperating with the first retaining member for receiving a storage device;
   wherein a supporting rim is bent from the bracket for engaging with the first retaining member;
   wherein a positioning hole is defined in the supporting rim, and a positioning tab protrudes from the first retaining member for engaging in the positioning hole.

6. The computer system as described in claim 5, wherein a flange extends from the side panel of the base for engages with the first retaining member.

7. The computer system as described in claim 5, wherein a locating tab protrudes from the first retaining member for engaging with a power supply.

8. The computer system as described in claim 5, wherein a concave portion protrudes the base, and a convex portion is formed on the bracket for engaging with the concave portion of the base.

9. A computer enclosure comprising:
   a base;
   a bracket;
   a first retaining member fixable on the base, the first retaining member having a circuit board area for supporting a circuit board, and a drive area shared with the bracket to form a cage for accommodating a storage device;
   wherein a supporting rim bends from the bracket for engaging with the first retaining member; and wherein the positioning hole is defined in the supporting rim, and a positioning tab protrudes from the first retaining member for engaging in the positioning hole.

10. The computer enclosure as described in claim 9, wherein a flange extends from the base for engages with the first retaining member.

11. The computer enclosure as described in claim 9, wherein a concave portion protrudes from the base, and a convex portion is formed on the bracket for engaging with the concave portion of the base.

12. The computer enclosure as described in claim 9, further comprising a power supply area defined on the first retaining member for securing a power supply.

13. The computer enclosure as described in claim 9, further comprising a second retaining member fixed on the base, wherein an empty area is retained between the first retaining member and the second retaining member.

* * * * *